United States Patent
Gupta et al.

(10) Patent No.: US 11,470,249 B1
(45) Date of Patent: Oct. 11, 2022

(54) PANORAMIC CAMERA DEVICE

(71) Applicant: Altia Systems Inc, Cupertino, CA (US)

(72) Inventors: Yashket Gupta, Santa Clara, CA (US);
Ram Natarajan, Cupertino, CA (US);
Otto Sponring, Los Altos, CA (US);
Naveed Alam, Cupertino, CA (US);
Aurangzeb Khan, Portola Valley, CA (US)

(73) Assignee: GN AUDIO A/S

( * ) Notice: Subject to any disclaimer, the term of this patent is extended or adjusted under 35 U.S.C. 154(b) by 0 days.

(21) Appl. No.: 15/860,576

(22) Filed: Jan. 2, 2018

Related U.S. Application Data (60) Provisional application No. 62/441,554, filed on Jan. 2, 2017.

(51) Int. Cl.
*H04N 5/232* (2006.01)
*H04N 5/06* (2006.01)
*G06T 3/40* (2006.01)

(52) U.S. Cl.
CPC ....... *H04N 5/23238* (2013.01); *G06T 3/4038* (2013.01); *H04N 5/06* (2013.01); *H04N 5/23232* (2013.01)

(58) Field of Classification Search
CPC .. H04N 5/23238; H04N 5/06; H04N 5/23232; G06T 3/4038
See application file for complete search history.

(56) References Cited

U.S. PATENT DOCUMENTS

| | | | |
|---|---|---|---|
| 5,657,073 A * | 8/1997 | Henley | G03B 37/04 348/38 |
| 9,736,367 B1 * | 8/2017 | Alam | H04N 5/23238 |
| 2010/0097444 A1 * | 4/2010 | Lablans | G03B 35/00 348/46 |
| 2010/0246976 A1 * | 9/2010 | Tolstaya | G06T 3/4038 382/218 |
| 2014/0347439 A1 * | 11/2014 | Jia | H04N 5/23238 348/36 |
| 2015/0162048 A1 * | 6/2015 | Hirata | H04N 5/2258 386/337 |
| 2017/0308116 A1 * | 10/2017 | Rondinelli | H04N 5/2257 |
| 2019/0215420 A1 * | 7/2019 | Kaneko | H04N 5/23238 |

* cited by examiner

*Primary Examiner* — Nhan T Tran
(74) *Attorney, Agent, or Firm* — HM Law Group LLP; Vani Moodley, Esq.

(57) ABSTRACT

A system for generating real-time panoramic video is disclosed. The system comprises a plurality of micro panoramic cameras which are enabled on a processing unit and which are configured to simultaneously capture video frames from each of the plurality of micro panoramic cameras, wherein the video frames captured by two consecutive camera sensors from the plurality of camera sensors include an overlapping field of view, synchronize and feed the captured images to the processing unit with equal predefined delay, stitch the video frames captured by each of the plurality of micro panoramic cameras and output a real-time panoramic video on a display.

15 Claims, 13 Drawing Sheets

PANORAMIC CAMERA DEVICE

This application claims the benefit of priority to U.S. Provisional Patent Application No. 62/441,554, which was filed on Jan. 2, 2017, the entire specification of which is incorporated herein by reference.

TECHNICAL FIELD

The present disclosure relates to video camera systems for capturing panoramic videos. More particularly, the camera systems which utilizes a processing method for capturing and producing panoramic videos.

BACKGROUND

Mobile devices such as cellular smart phones usually include a single camera sensor. However, these conventional single camera sensors have a narrow field of view (FOV) and capture a small portion of the FOV desired. A typical camera sensor integrated in a smartphone captures only about 75° FOV, whereas the FOV of a human vision is about 160°-180°. In order to capture panoramic images with increased field of view some conventional art disclose rotating the single camera sensor for capturing a panoramic videos/photo of a scene. However, this method of capturing a panoramic video is very error prone and sometime low quality.

In another art, a single sensor camera may be mounted on a tripod and the camera is rotated about an axis in order to capture a series of images which are then processed to generate a panoramic image of the scene. Wide angle fish-eye lenses are also used to capture a very wide FOV. However, these lenses produce a highly distorted image, both in terms of rectilinear distortion and scale distortion.

Complex lens systems are often used to produce high quality very wide angled FOV images and/or videos. However, these complex lens systems are often very expensive as well as bulky. Therefore, the complex lens systems do not make a good option to be integrated in smart phones. Hence, a panoramic camera system which may provide enhanced quality panoramic images and videos with increased FOV are required. Further, the camera systems which may be embedded in mobile devices or operable by a mobile device for producing high quality panoramic real-time videos are required.

SUMMARY

This Summary is provided to comply with 37 C.F.R. § 1.73, requiring a summary of the invention briefly including the nature and substance of the invention. It is submitted with the understanding that it will not be used to interpret or limit the scope or meaning of the claims.

The present disclosure relates to a panoramic micro camera system comprising dual micro cameras. The two micro cameras are arranged at an angle and configured to capture frames having an overlapping region. The panoramic micro camera system comprises a processing unit configured to process the frames captured in real time and output a stitched video on a display. The panoramic micro camera system may be integrated in state-of-the-art smart phones which delivers real-time panoramic video in a form factor and with functional performance requirements that are compatible with current generation state-of-the-art smart phone capabilities. The design can be integrated into smart phone devices in order to capture real-time panoramic video.

The details of one or more embodiments are set forth in the accompanying drawings and the description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

The teachings and principles of the present invention are applicable to a wide variety of imaging systems and sensors, relying on a number of equipment and platform configurations. For purposes of explanation and illustration, however, the present invention is hereafter described in reference to one particular embodiment of a panoramic micro camera system. It should be understood, however, that those of skill in the art will, upon reference to this description, be able to apply the principles and teachings of the present invention in a wide variety of imaging systems from personal digital cameras to satellites and other spacecraft-based surveillance systems.

Figure 1:
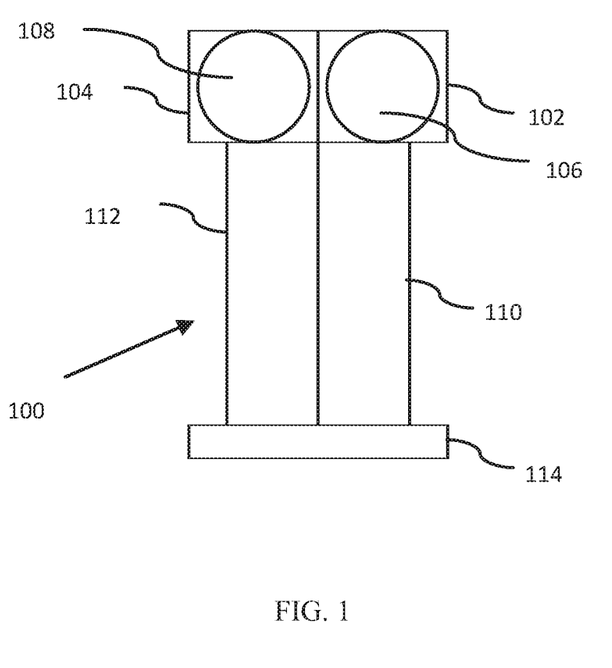
FIG. 1 illustrates a smartphone integratable dual micro camera system 100, in accordance with one embodiment of the invention.

FIG. 1 illustrates a smartphone integrable dual micro camera system 100. The micro camera system 100 includes two or more micro panoramic cameras such as cameras 102 and 104. Each of the cameras 102 and 104 include digital sensors 106 and 108 which may be associated to suitable image sensors. The image sensors may be charge-coupled device (CCD) or complimentary metal-oxide semiconductor (CMOS) imaging sensors, as is known in the art. In an embodiment, the image sensors used may have optical format of ¼" mounted on a suitable Printed Circuit Board Assembly (PCBA) with required control electronics.

The panoramic micro camera system 100 may include cables 110 and 112 which may be connected to each of the micro panoramic cameras 102 and 104 on one end and to a multi-pin connector 114 on the other end. The multi-pin connected may be used to connect the panoramic micro camera system 100 to an external device. In an embodiment, the panoramic micro camera system 100 may be connected to an external device via a wireless connection (not shown). The cables 110 and 112 may be used for communication as well as optionally provide power to the panoramic micro camera system 100. In an embodiment, a multi-pin PCB to PCB SMT type connector may be used as cables 110 and 112. The cables 110 and 112 may be used to provide required control, data and power connection to all the image sensors in the panoramic micro camera system 100.

The micro panoramic cameras 102 and 104 may be arranged and oriented accordingly with respect to each other in order to include an overlapping field of view between each other.

In an embodiment, the panoramic micro camera system 100 may include a processor which may enable registration of the captured images and stitching of the registered images to generate real time panoramic video. In an embodiment, the processor may be enabled to perform several tasks related to creation of a real-time panoramic video.

The panoramic micro camera system 100 may be connected to any device capable of receiving and rendering video/image for example, cellphones, tablet computers, notebook computers, etc. Data communication between the panoramic micro camera system 100 and the device may take place via a variety of protocols such as USB 3.0, USB 3.1 or USB 3.2 etc. The processor of the panoramic micro camera system 100 may provide smooth integration with any processor known in the art present in any of the external devices mentioned above without any additional driver installation.

Figure 2:
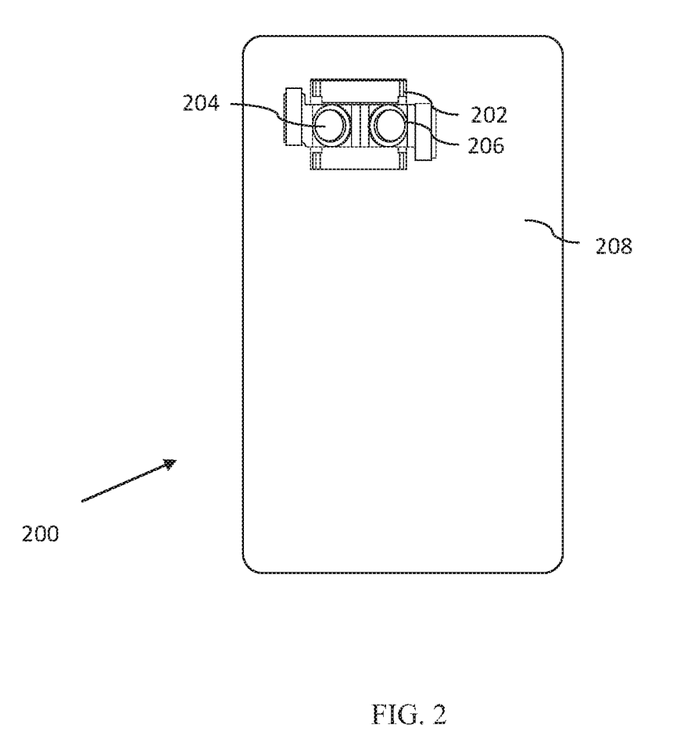
FIG. 2 illustrates an example placement of the dual micro camera system 200 on the rear side of a smart mobile device, in accordance with one embodiment of the invention.

FIG. 2 illustrates an example placement of the dual micro camera system 200 on the rear side 208 of a smart mobile device 200. The dual micro camera system 202 may include two micro panoramic cameras 204 and 206 facing the back panel 208 of the mobile device 200. The micro cameras 204 and 206 are positioned in a manner, with respected to each other, to produce frames with overlapping FOVs which may be processed and stitched in real time to produce panoramic images or video as output.

Techniques for generating the stitched panoramic video are described in co-pending U.S. patent application Ser. No. 13/902,136 entitled "Locally Adaptive Luminance and Chrominance Blending in a Multiple Imager Video System", U.S. patent Ser. No. 13/902,186 entitled "Dynamic Stitching for a Multiple Imager Video System", and U.S. patent Ser. No. 13/902,248 entitled "Stitching for a Multiple Imager Video System Based On A Non-Linear Seam", each of which is incorporated herein in its entirety.

In one embodiment, advanced stitching techniques such as is described in co-pending U.S. patent application Ser. No. 13/902,136 entitled "Locally Adaptive Luminance and Chrominance Blending in a Multiple Imager Video System", U.S. patent Ser. No. 13/902,186 entitled "Video System for Real-Time Panoramic Video Delivery" may be used to perform the stitching, each of which is incorporated herein in its entirety.

In one embodiment, the panoramic micro camera system may be architected to generate Panacast video, which is in a non-standard video format of 2700×540 (standard formats of video are 3840×2160, 1920×1080, 1280×720, 640×480, etc.). In one embodiment, multiple reformatting options may be used to enable video formats. In one embodiment, for reformatting the Panacast video any of the techniques described in co-pending U.S. patent application Ser. No. 14/058,187 entitled "Repacking of Panoramic Video Based on Standard Image Formats", which is hereby incorporated herein by reference in its entirety, may be used.

The micro cameras 204 and 206 may be thin in width to be embedded in the mobile device 208. The panoramic micro camera system 202 may be connected to a processing unit (not shown in FIG. 2). The processing unit may perform stitching of frames which have overlapping FOVs in real time. The micro cameras 204 and 206 may be synchronized to operate and feed data to the processing unit with equal delay. This enables the processing unit to receive the images synchronously from the micro cameras 204 and 206.

Techniques for synchronizing the plurality of imagers are described in co-pending U.S. patent application Ser. No. 15/648,418 entitled "Video System for Real-Time Panoramic Video Delivery" and U.S. Pat. No. 9,736,367B1 entitled "Video System for Real-Time Panoramic Video Delivery", each of which is incorporated herein in its entirety.

In an embodiment, the panoramic micro camera system 202 may be implemented to run on a Snapdragon 820 processor or any processor known in the art and may be used in any android OS compatible smart mobile devices which may include an OpenCL pipeline with sub one frame latency.

Figure 3A:
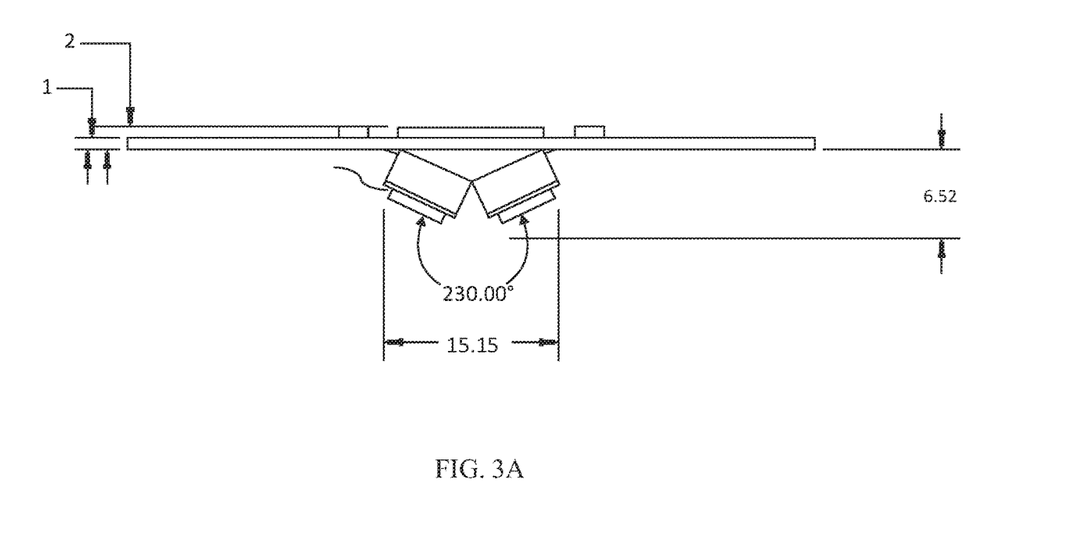
FIG. 3A illustrates a top view of micro camera placed on an optical head integrated in a smart mobile device, in accordance with one embodiment of the invention.

FIG. 3A illustrates a top view of a panoramic micro camera system 300. The panoramic micro camera system 300 may include two micro cameras 302 and 304 mounted on an optical head 306. In an embodiment, the two micro cameras 302 and 304 may be placed in an arc. The micro cameras 302 and 304 are mounted on the optical head 306 at a predefined angle with each other for achieving an overlapping FOV 310 between the two micro cameras 302 and 304. In an embodiment, the predefined angle between the two micro cameras is 230°. The distance between extreme edges of the micro cameras 302 and 304 may be 15.15 mm. and the height of the micro cameras 302 and 304 from the optical head 306 may be 6.52 mm.

Figure 3B:
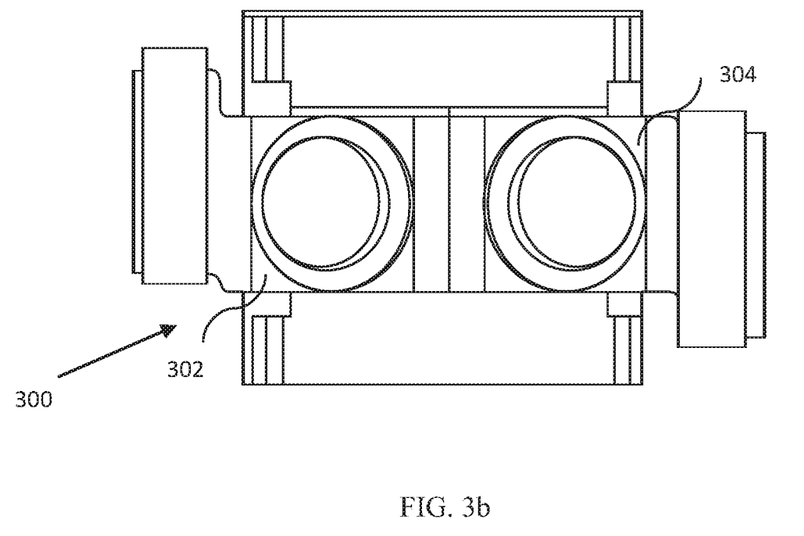
FIG. 3B illustrates an enlarged front view of dual micro camera 300 integrated in a smart mobile device, in accordance with one embodiment of the invention.

FIG. 3B illustrates an enlarged front view of dual micro camera 300 integrated in a smart mobile device. The dual micro camera 300 may include two micro cameras 302 and 304 which may be arranged in a diverging (convex) orientation or in a converging orientation with respect to the optical head 306.

Figure 4A:
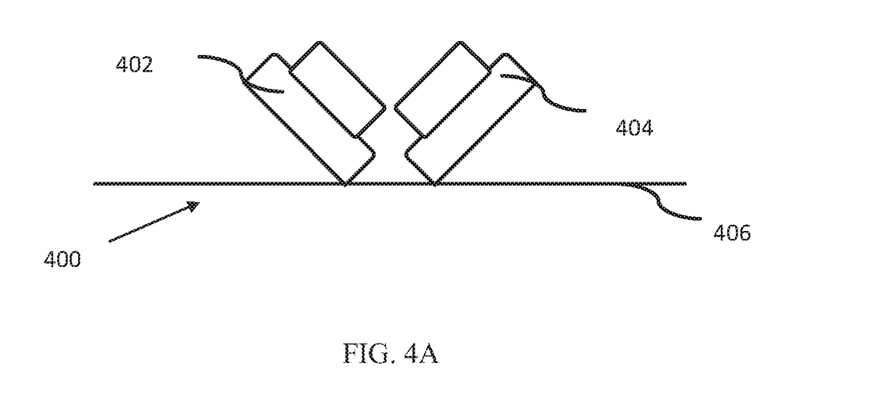
FIG. 4A illustrates a top view of dual micro cameras arranged in converging (concave) position with each other, in accordance with one embodiment of the invention.

FIG. 4A illustrates a top view of dual micro camera system 400 arranged in converging (concave) position with each other. The dual micro camera system 400 includes two micro cameras 402 and 404 which may be arranged in a converging (concave) orientation with respect to the optical head 406.

Figure 4B:
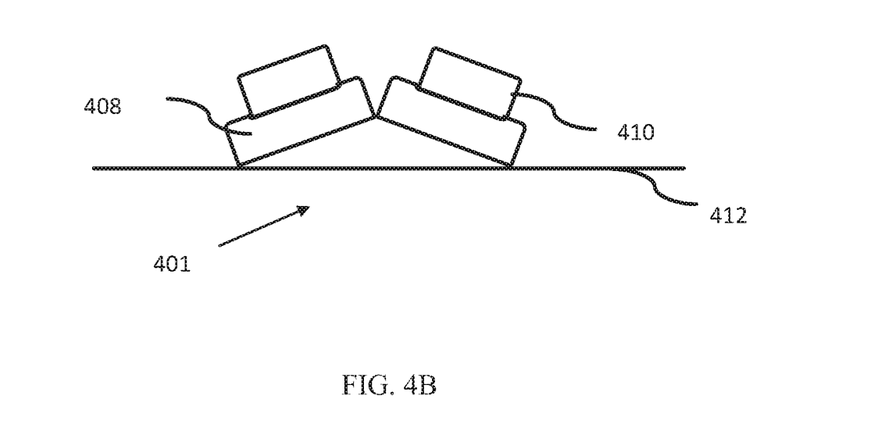
FIG. 4B illustrates a top view of dual micro cameras arranged in diverging (convex) position with each other, in accordance with one embodiment of the invention.

FIG. 4B illustrates a top view of dual micro camera system 401 arranged in diverging (convex) position with each other. The dual micro camera system 400 includes two micro cameras 408 and 410 which may be arranged in a converging (concave) orientation with respect to the optical head 412.

Figure 5:
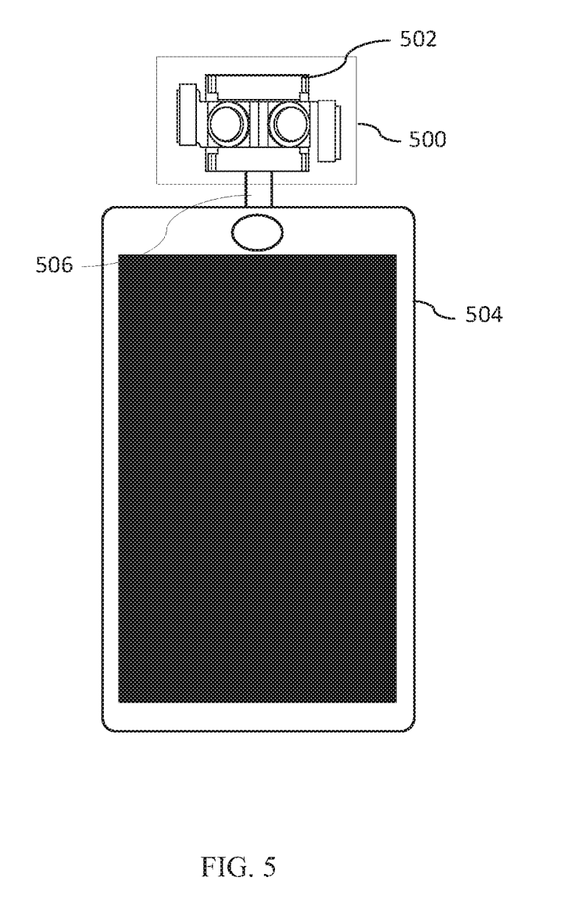
FIG. 5 illustrates a pluggable panoramic micro camera system 500, in accordance with one embodiment of the invention.

FIG. 5 illustrates a pluggable panoramic micro camera system 500. The panoramic micro camera system 500 may include plurality of micro cameras 502 having overlapping FOV. The panoramic micro camera system 500 is enabled to be plugged to a mobile device 504 through an interface 506 such as a micro USB stick which may be compatible to protocols such as USB 3.0, USB 3.1 or USB 3.2 etc.

In one embodiment, the pluggable micro camera system 500 may be implemented on a single flex PCBA which may be interfaced to any processing sub-system based on an FPGA/ASIC or a general-purpose processor compatible to a PC or a smart phone.

In one aspect, the invention involves optimizing the OpenCL software architecture and implementation to fully utilize powerful GPUs available on current state-of-the-art smartphone platforms and hence accomplish the stitching in real-time and in software.

In an embodiment, the system 500 may be a plug and play device to deliver real time panoramic video with 4K resolution. Further, the pluggable panoramic micro camera system 500 may be used for several high-performance and high-volume applications such as for automotive (drone based) uses due to ultra-small size, low cost and light weight.

In an embodiment, any smart phone camera known in the art like iPhone7™ and Huawei P9™ may be enhanced easily to a panoramic camera module by plugging the pluggable panoramic micro camera system 500. A z-axis actuator may be used to enable the cameras to switch from coplanar mode to panoramic mode in order to deliver an extendable FOV or panoramic FOV.

In an embodiment, the pluggable micro camera system 500 may be used for creation, consumption and distribution of panoramic video in real-time from a smartphone platform. The videos created may be extended to a stitched 360° FOV and can also deliver real-time 3D video output by employing multi-imager system including overlapping FOVs.

Figure 6:
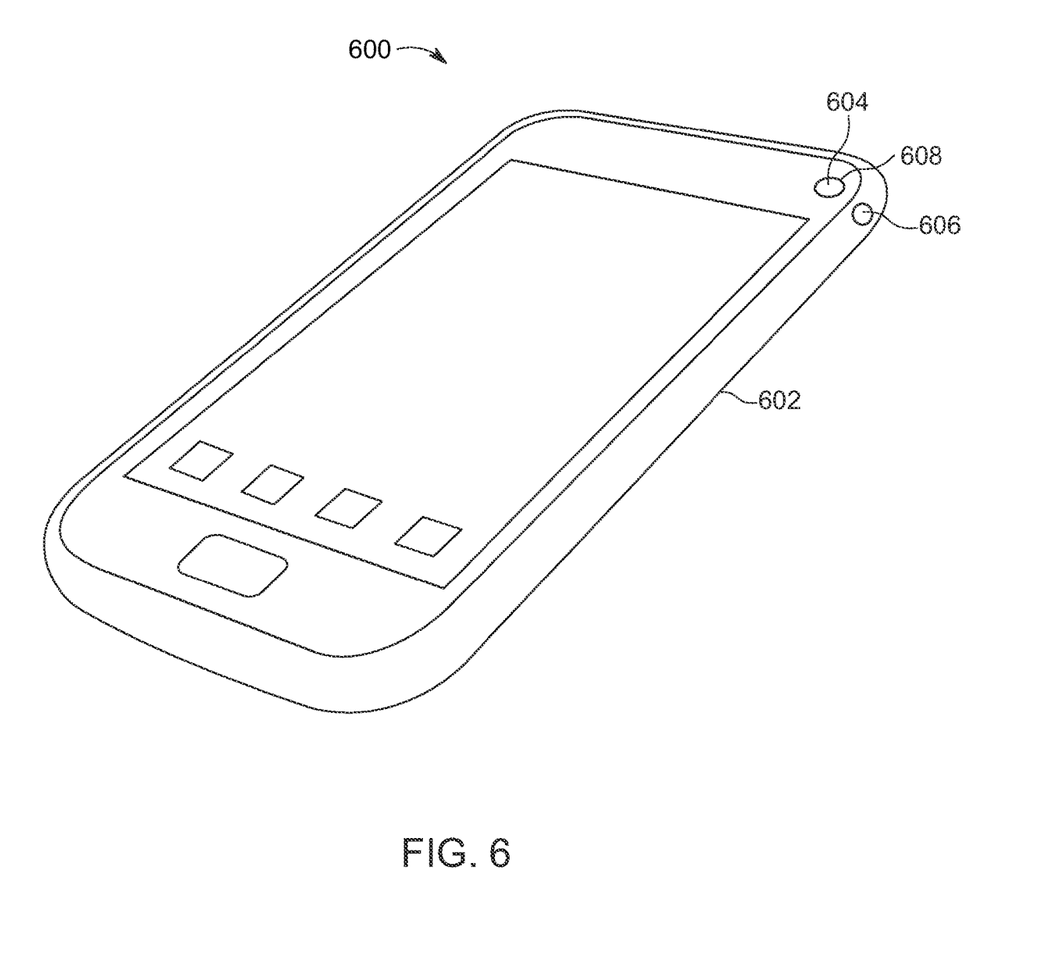
FIG. 6 illustrates an example of placement of dual micro camera system embedded in a smart mobile device, in accordance with one embodiment of the invention.

FIG. 6 illustrates an example of placement of dual micro camera system embedded in a smart mobile device 602 in camera arrangement 600. The camera arrangement 600 may include a first micro camera 604 placed on the front side of the mobile device 602 or on the back side of the mobile device and a second micro camera 606 which may be embedded on a side of the mobile device 610 as shown in FIG. 6. In an embodiment, the micro cameras 604 and 606 may have an overlapping FOV 608 which may be used by the stitching algorithm to dynamically stitch the simultaneously captured video frames and output a real time panoramic video. The embodiment enables a thin z-height design which is a critical design constraint for smartphone integration.

Figure 7:
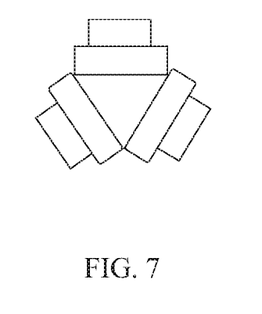
FIG. 7 illustrates a three-micro camera system for capturing 360° panoramic videos, in accordance with one embodiment of the invention.

FIG. 7 illustrates three micro camera arrangements for capturing 360° panoramic videos. In an embodiment, any number of imagers may be utilized to generate a high quality real time panoramic video.

Figure 8:
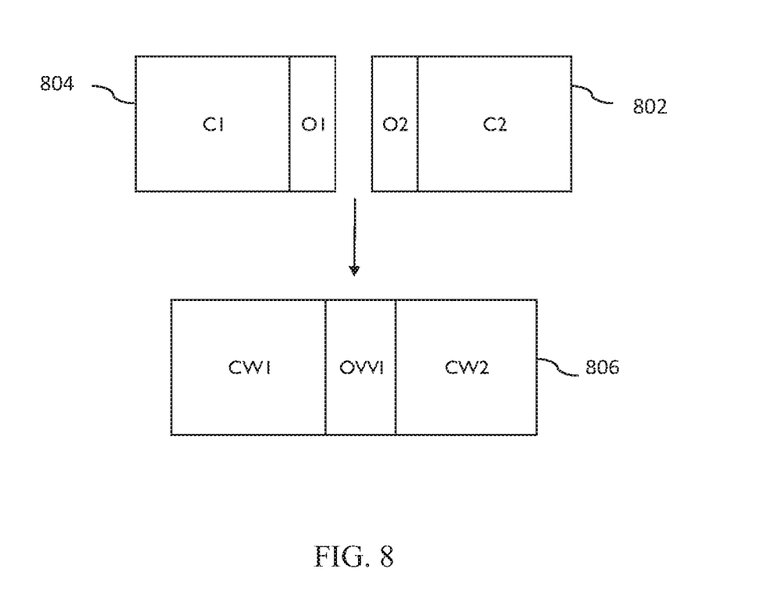
FIG. 8 illustrates an example of real time stitching of images, in accordance with one embodiment of the invention.

FIG. 8 illustrates an example of real time stitching of images. Frames captured using the micro cameras such as cameras 204 and 206 as shown in FIG. 2 are fed to an image processing unit (not shown in the Fig.) of a mobile device 200 (as shown in FIG. 2). The image processing unit may produce raw video frames to YUV frames.

For the proper operation of an array of micro camera systems—which are based on a multiple image sensor that feed data into an image signal pipeline—it is desirable to feed data from all sensors to the image processing unit with little and identical delay such that image data arrive at the same point in time at the image processing unit.

Stitching of frames may be performed on these YUV frames to produce a real time stitched video which may be displayed on a display screen of the mobile device 200 (as shown in FIG. 2). The two YUV frames 802 and 804 may be stitched using an overlapping area O1 and O2 in each of the YUV frames to output a stitched frame 806. The stitched frame may include non-overlapping regions C1 and C2 of the two YUV frames 802 and 804 and the overlapping region OW1 which was common in the two YUV frames 802 and 804.

Figure 9A:
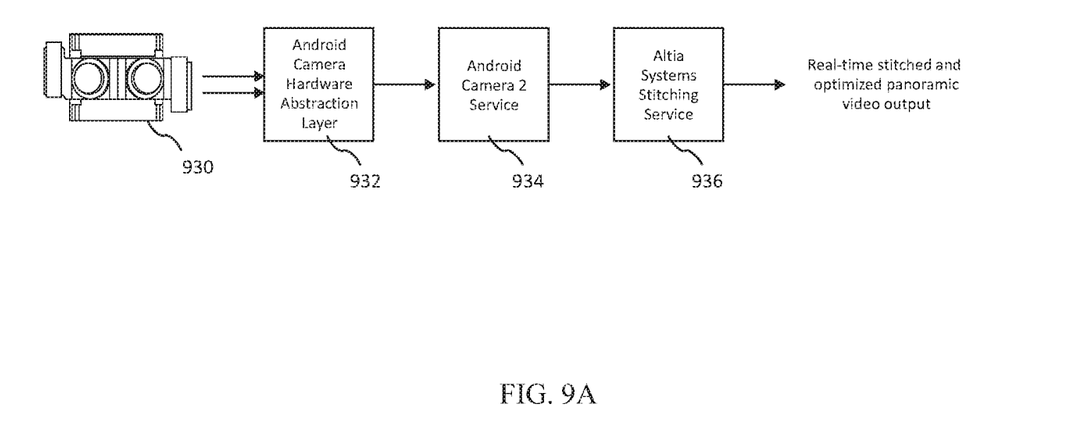
FIG. 9A illustrates a block diagram of software processing of panoramic micro camera system for capturing and outputting panoramic videos, in accordance with one embodiment of the invention.

FIG. 9A illustrates a block diagram of software processing of panoramic micro camera system for capturing and outputting panoramic videos. In an embodiment, the software processing may be performed on an Android OS compatible software. The software leverages the latest Android OS framework to manage and capture videos from the two micro cameras embedded within the dual micro camera module 930. Recent enhancements to the Android OS include a new software-camera2 service, which is essential to enable stitched video feed as a standard camera feed to all Android applications.

The Android HAL (Hardware Abstraction Layer) 932 has been enhanced to enable concurrent streaming and synchronization of two camera modules. The Android Camera2 service 934 is enhanced to provide uniform auto exposure settings from the two micro camera modules 936.

A new Android service has been developed and realized as PanaCast stitching service 936. This service provides real-time stitching of two camera video streams and presents the output as a single real time panoramic camera stream to Android camera applications. In this design, we use 2048× 1536 pixels per frame resolution images from each sensor to output 5120×1440 pixels per frame stitched images in real-time. In an embodiment, the stitching latency is ~15 ms.

As shown in FIG. 9A, the two micro camera modules 930 feed raw Bayer video into the Android Camera Hardware Abstraction Layer (HAL) 932, which uses an Image Signal Processor (ISP) to process the raw video to produce YUV frames into the Android Camera2 Service layer 934. A newly developed PanaCast Computer Vision Engine (PCVE) real-time software application 936 runs the stitching pipeline in Open CL (as one instance/example) and consumes YUV frames from the Android Camera2 Service 930 to produce the stitched frames in the block 936, either for display or to be fed into an encoder.

Figure 9B:
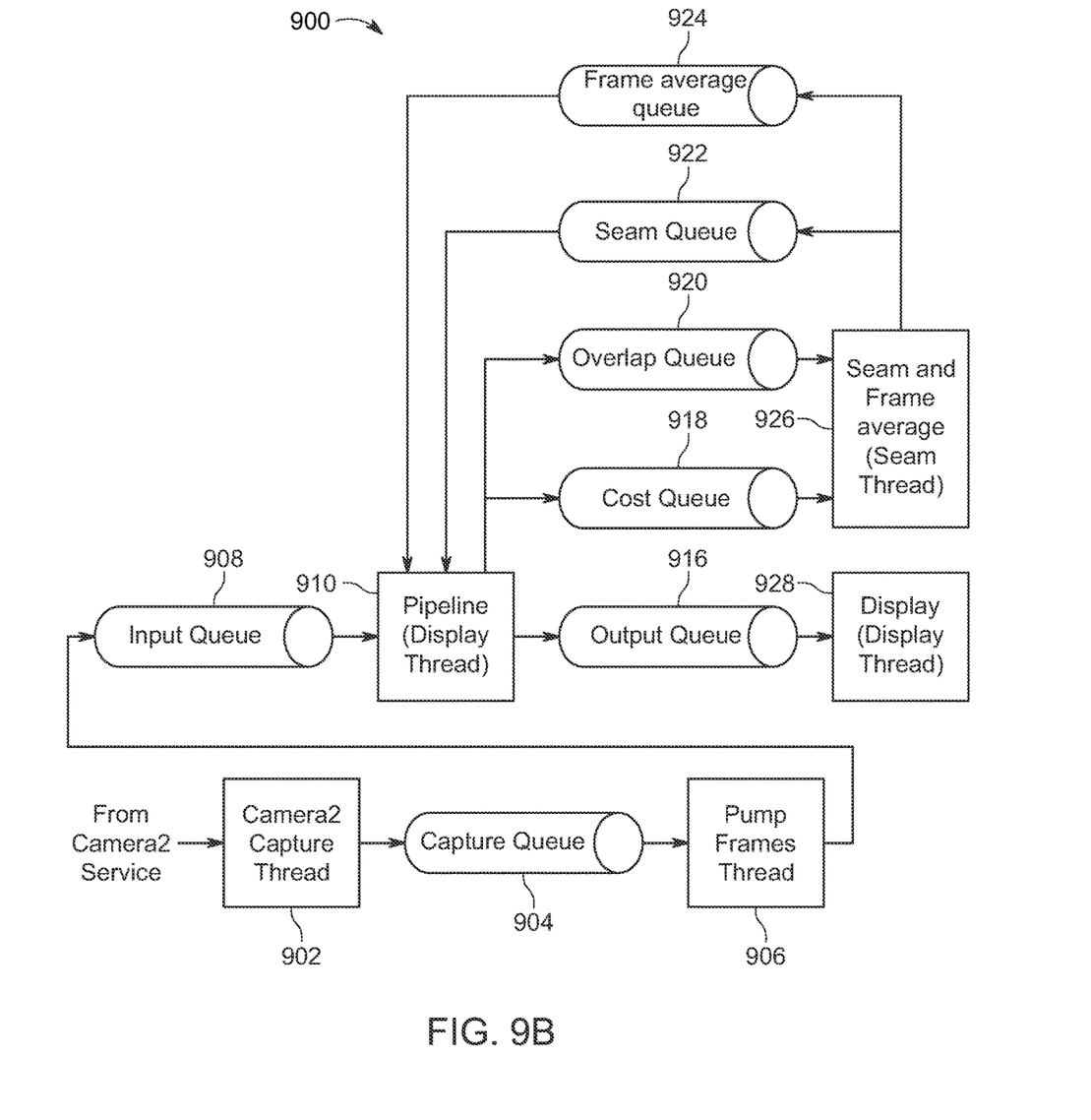
FIG. 9B illustrates detailed stitching software pipeline and application of panoramic micro camera system, in accordance with one embodiment of the invention.

FIG. 9B illustrates stitching software pipeline and application of panoramic micro camera system 900 in detail. The software has four main threads: capture thread 902, pump frames thread 906, display thread 928 and seam thread 926. The capture thread 902 captures frames from the Android Camera2 Service, which delivers frames in YUV420 format. The YUV420 frames are then fed into a capture queue 904. A pump frames thread 906 reads frames from the capture queue 904 and pushes them into an input queue 908.

Figure 10:
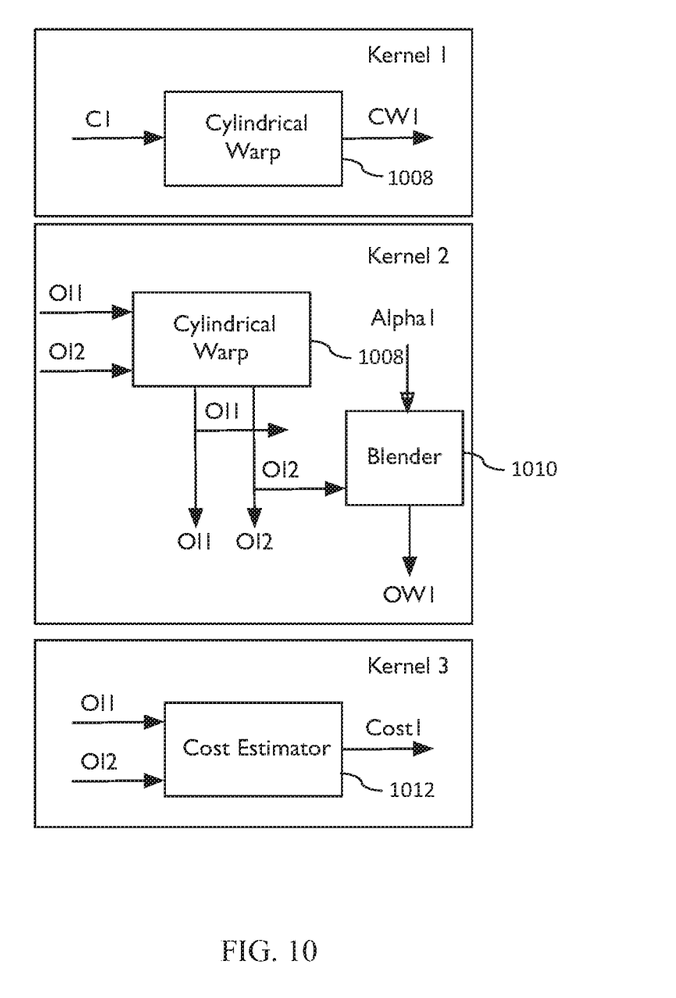
FIG. 10 illustrates details of OpenGL block of FIG. 9B, in accordance with one embodiment of the invention.
Figure 11:
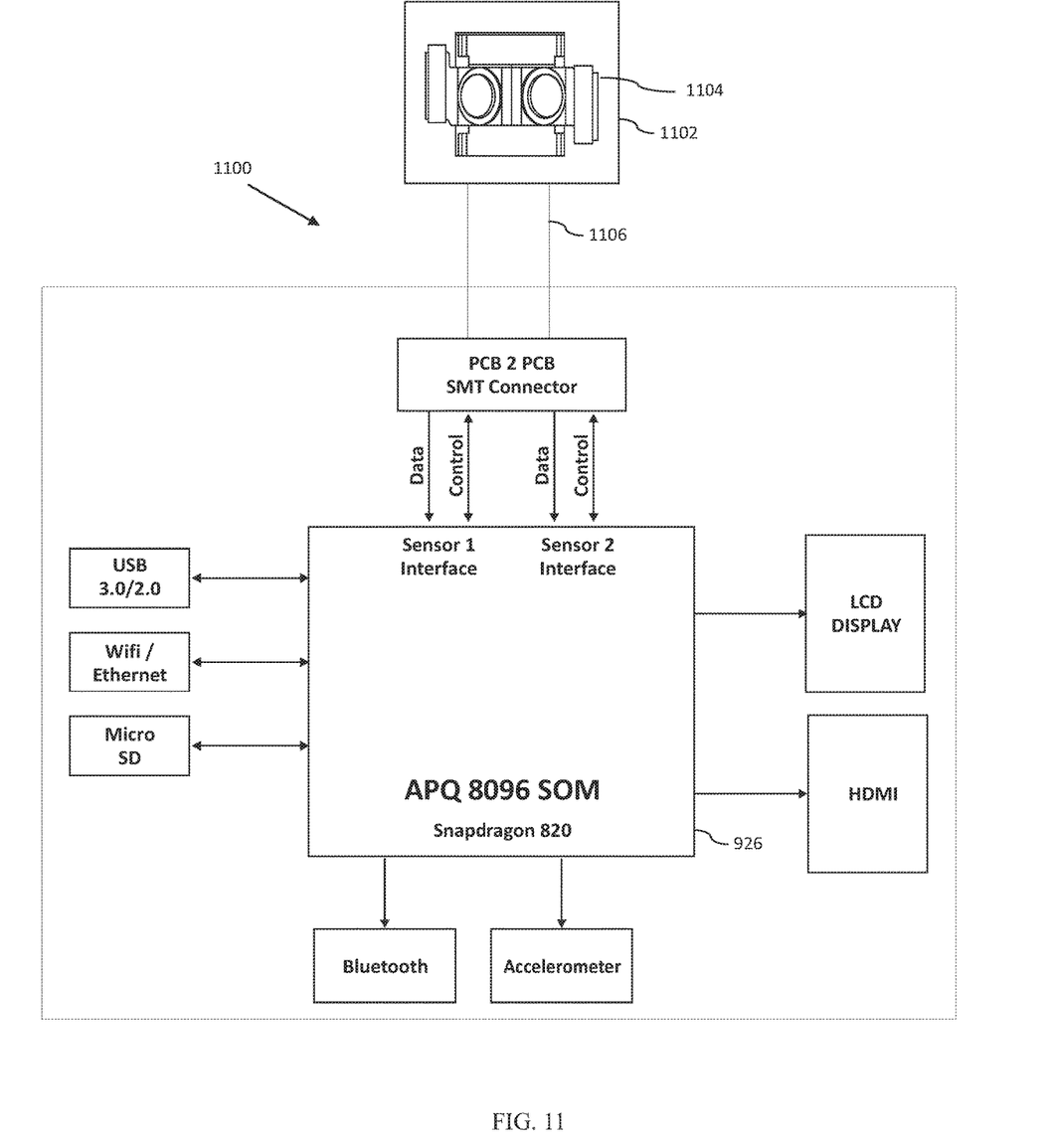
FIG. 11 illustrates an architectural block diagram of a standalone micro panoramic camera system enabled on any smart phone or an electronic device, in accordance with one embodiment of the invention.

The display block 910 runs both the OpenCL pipeline and OpenGL pipeline (to be described in FIG. 10 and FIG. 11 in detail). The OpenCL pipeline and OpenGL pipeline outputs the stitched frames into an output queue 916 whenever there may be a frame available in the input queue 908. The display pipeline 910 reads the frames from the output queue 916 and displays the frame using OpenGL pipeline. The OpenCL pipeline produces texture frames that can be directly passed on to the OpenGL code without any copies (the frames reside in GPU memory). This improves system throughput and latency.

Specifically, in this algorithmic design, the warp calculations do no rely on a lookup table but are calculated in real-time in the pipeline. The algorithm used in the stitching pipeline is a modification of the algorithm described in co-pending U.S. patent application Ser. No. 14/757,716 entitled "Cylindrical Panorama" which is included herein in its entirety.

The display thread 910 may also output the cost frames and the overlap frames to the cost queue 918 and the overlap queue 920 respectively. It may then initiate a seam calculation engine in the seam queue 922 which processes these queues to output the optimal seam as well as the frame averages. Both these tasks have been optimized using SIMD processing architecture, hence reducing computation effort and processing time (which directly improves real-time latency).

The OpenCL block includes a GPU which may accept images from the two micro cameras 204 and 206 (as shown in FIG. 2) and stitches them as illustrated in FIG. 8.

The OpenCL processing is split into three stages: the cylindrical warper, the overlap processor, and the cost estimator. Please refer to FIG. 10 for related information. The cylindrical warper warps each of the input images to project it onto a cylindrical surface.

Techniques for projection of input images to cylindrical surface are described in co-pending U.S. patent application Ser. No. 14/757,716 entitled "CYLINDRICAL PANORAMA", which is incorporated herein in its entirety.

The present system, provides a novel stitching service which could be added to the Android OS as a standard part of the release, and hence made widely available to other services/applications.

While the current design has been realized based on an Android OS smartphone, the OpenCL, Open GL software can be run on any OpenCL-capable standard processor.

The display thread runs both the OpenCL pipeline as well as the display (OpenGL). It runs the pipeline whenever there is a frame available in the input queue. The pipeline outputs the stitched frames into an output queue.

FIG. 10 illustrates OpenGL block in detail of FIG. 9B. The OpenGL block may include the cylindrical warper 1008, the overlap processor 1010 and the cost estimator 1012. The cylindrical warper 1008 may warp each of the input images to project it onto a cylindrical surface. The overlap processor 1010 may process, stitch and blend the overlap region. The cost estimator 1012 may produce signals for the cost calculations that are performed on the CPU. The details of functional blocks, such as the cylindrical warper, seam finder, stitcher and blender are described in co-pending U.S. patent application Ser. No. 14/757,716 entitled "Cylindrical Panorama", which is incorporated herein in its entirety.

FIG. 11 illustrates an architectural block diagram 1100 of a standalone micro panoramic camera system 1102 enabled on any smart phone or an electronic device. An array of micro cameras 1104 associated with corresponding image sensors generate image data and feed into an image signal pipeline. It may be desirable to feed image data from all sensors to the image processing unit with little and same delay such that image data arrive at the same point in time at the image processing unit. The architecture 1100 includes a Qualcomm® 8096 SOM (System on Module). The 8096 enables capture up to 28 megapixels video from 1-3 camera modules.

In an embodiment, the array of micro camera modules 1104 are mounted on an optical head at a specific angle to achieve a 20% overlap between the FOVs of the camera sensors.

The standalone micro panoramic camera system 1102 is connected to the processor 8096 through a PCB to PCB connector 1106.

In an embodiment, starting of image capture is synchronized by sending frame start triggers to all image sensors with a circuit whereby the frame start command is routed to all image sensors in one atomic programming sequence via a known in the art interface protocol such as I²C or TWI (two wire frame).

In an embodiment, all image sensors may be driven by a single clock source and a common RESET signal.

The 8096 processor includes a USB 2.0/3.0 interface, micro SD, Bluetooth and/or wireless communication interface such as Wifi/Ethernet etc.

The 8096 processor is further configured to a display device through an HDMI interface.

The 8096 further includes an accelerometer.

Figure 12:
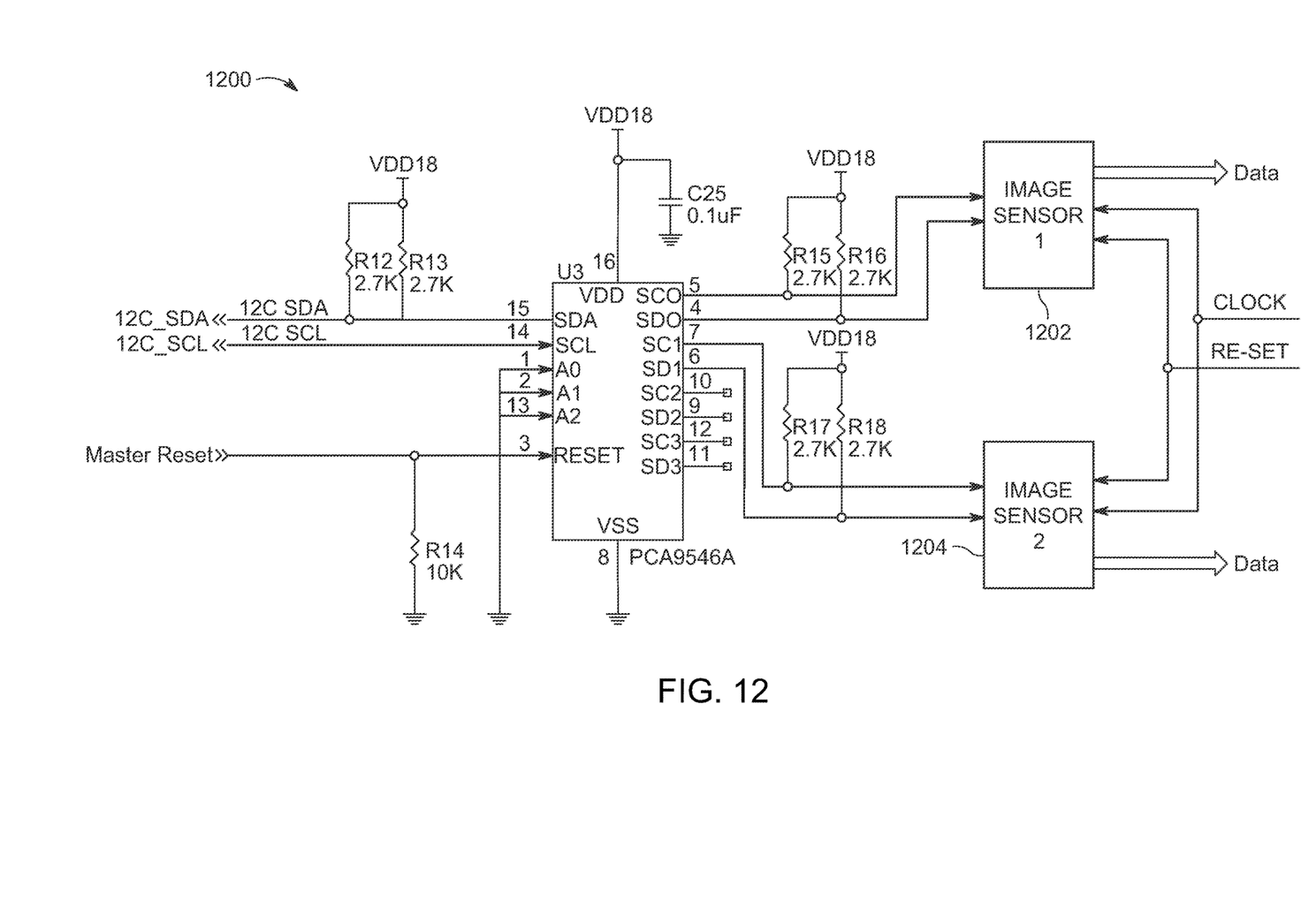
FIG. 12 illustrates design implementation of dual micro camera system, in accordance with one embodiment of the invention.

FIG. 12 illustrates a design implementation 1200 of the standalone dual micro camera system of FIG. 11. U3 in this case is programmed in a way that each image sensor 1202 and 1204 included in the camera module receive a command at the same time to enable each of the sensors to capture an image at the same time. The data generated by the image sensor module 1202 is read out in parallel and at the same time by using synchronized clocks.

The camera modules 1202 is connected to the 8096 processor through a specially designed PCB. The PCB provides an interface between the camera modules 1202 and 8096 processor as well as necessary hardware design to achieve synchronization between the sensor modules.

The control interface is provided based on the I²C protocol which provides register level control of the camera modules 1202. This interface is used for programming of the camera modules 1202. The I²C protocol is also used to synchronize frame generation from the camera modules 1202.

Frame synchronization is essential for stitching of adjacent frames. The synchronization can be achieved at multiple levels depending on the camera module hardware features based on clock, pixel registration, image line and frame levels etc.

The design 1200 achieves frame level synchronization with special enhancements to the sensor module driver in the Android operating system.

Data or Frame Interface

The frame interface is based on the high speed MIPI protocol and it is capable of capturing full 16 Megapixels (8 Megapixel per sensor) at 30 frames per second (FPS) from dual micro camera module 1202.

While the current design has been realized based on an Android OS smartphone, the OpenCL, Open GL software can be run on any OpenCL-capable standard processor.

While the foregoing written description of the disclosure enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

The method of the present invention may be performed either in hardware, software, or any combination thereof, as those terms are currently known in the art. In particular, the present method may be carried out by software, firmware, or microcode operating on a computer or computers of any type, including preexisting or already-installed image processing facilities capable of supporting any or all of the processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Although, the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer-implemented method for generating real time panoramic video, the method comprising:
    capturing simultaneous video frames with each of a plurality of camera sensors, wherein the video frames captured by two consecutive camera sensors from the plurality of camera sensors include an overlapping field of view;
    for each of the video frames captured calculating a location of a non-linear seam by a processing device, based on a spatial and a temporal distortion in an overlapping region corresponding to the overlapping field of view, wherein the location of the non-linear seam is determined based on a minimal cost path for traversing the overlapping region;
    synchronizing and feeding the captured video frames to the processing device with an equal predefined delay;
    stitching in the processing device, the video frames captured by each of the plurality of camera sensors; and
    outputting a real-time panoramic video on a display.

2. The computer-implemented method for generating real time panoramic video of claim 1, wherein each of the plurality of camera sensors are arranged to include the overlapping field of view.

3. The computer-implemented method for generating real time panoramic video of claim 1, wherein the processing device may be pluggable to an external device using a wired interface.

4. The computer-implemented method for generating real time panoramic video of claim 3, wherein the wired-interface operates on USB 3.0 protocol.

5. The computer-implemented method for generating real time panoramic video of claim 4, wherein the processing device is communicably coupled to a processor of the external device.

6. A system for generating real time panoramic video, comprising:
    a plurality of camera sensors enabled by a processing unit which is configured to:
    capture simultaneous video frames with each of the plurality of camera sensors, wherein the video frames captured by two consecutive camera sensors from the plurality of camera sensors include an overlapping field of view;
    for each of the video frames captured calculate a location of a non-linear seam, by the processing unit, based on a spatial and a temporal distortion in an overlapping region corresponding to the overlapping field of view, wherein the location of the non-linear seam is determined based on a minimal cost path for traversing the overlapping region;
    synchronize and feed the captured video frames to the processing unit with an equal predefined delay;
    stitch in the processing device, the video frames captured by each of the plurality of camera sensors; and
    output a real-time panoramic video on a display.

7. The system for generating real time panoramic video of claim 6, wherein the processing unit is integrable to a smart mobile device.

8. The system for generating real time panoramic video of claim 7, wherein the system comprises dual camera sensors placed on the back panel of a smart mobile device facing the world side.

9. The system for generating real time panoramic video of claim 8, wherein the dual camera sensors are positioned to produce frames with overlapping field of views.

10. The system for generating real time panoramic video of claim 8, wherein one sensor of the dual camera sensors is placed on front surface of the smart mobile device and second sensor is placed on a side surface.

11. The system for generating real time panoramic video of claim 8, wherein the dual camera sensors are mounted on an optical head at a predefined angle.

12. The system for generating real time panoramic video of claim 11, wherein the predefined angle between the camera sensors is 230°.

13. The system for generating real time panoramic video of claim 11, wherein the dual camera sensors are mounted on an optical head in a diverging orientation.

14. The system for generating real time panoramic video of claim 11, wherein the dual camera sensors are mounted on an optical head in a converging orientation.

15. The system for generating real time panoramic video of claim 6, wherein the system is implemented on a single flex printed circuit board assembly (PCBA) which may be pluggable to a smart mobile device through a micro USB port.

* * * * *